Dec. 11, 1928.

G. GEARY 1,694,738

FLOOR FINISHING APPARATUS

Filed Feb. 14, 1927

INVENTOR.
G. Geary.
BY J. Edward Maybee.
ATTY.

Patented Dec. 11, 1928.

1,694,738

UNITED STATES PATENT OFFICE.

GEORGE GEARY, OF TORONTO, ONTARIO, CANADA.

FLOOR-FINISHING APPARATUS.

Application filed February 14, 1927. Serial No. 168,030.

This invention relates to floor finishing apparatus, and more particularly to floor polishers of the type employing an electrically driven rotary brush, and my object is to provide simple apparatus of this character in which the wear of the brush may be readily compensated, in which any oil dripping from the motor bearings is prevented from reaching the driving parts, and in which the bearings on the brush spindle are easily assembled and positioned for mounting on the frame.

I attain my objects by providing a frame at one end of which is journalled a brush and at the other end is mounted a pair of ground wheels. The frame is provided with lugs in which the stems of the axle journals are threaded. By removing the axle and adjusting the journals therefor any wear on the brush bristles may be readily compensated for.

The brush is driven by means of a friction disk from a motor. This disk has a rubber face for engagement with the periphery of the brush. A cup shaped oil catching and distributing device mounted on the friction disk is adapted to prevent any oil leaking past the motor bearing from dripping on to the rubber of the disk.

Figure 1:
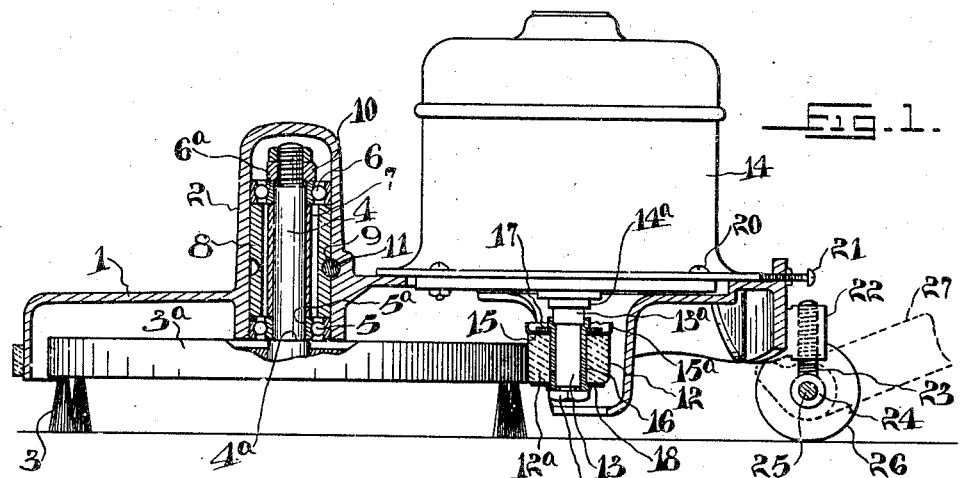
Figure 2:
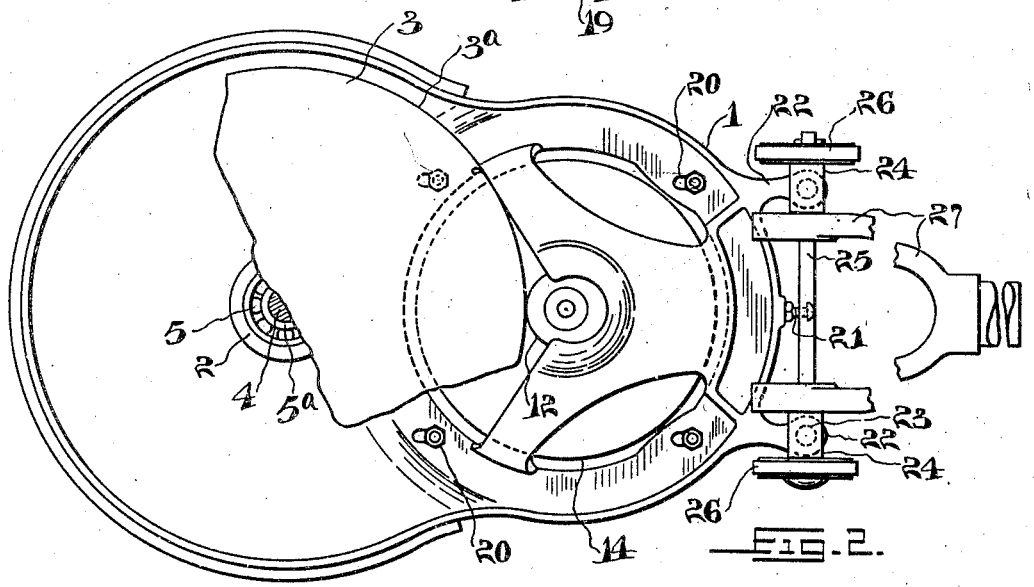

On the brush spindle are mounted two roller bearings having their inner casings held in spaced relationship to one another by means of a distance sleeve disposed on the spindle. A distance collar disposed on the sleeve has its opposite ends in engagement with the outer casings of the ball bearings. A nut threaded on the spindle holds all the parts in position so that the assembly may be readily inserted in a bored boss on the frame. A pin passed through a recess in the distance collar and a hole in the boss secures the brush in position on the frame. The constructions are hereinafter described more fully and are illustrated in the accompanying drawings in which Fig. 1 is a longitudinal section, partly in elevation, of the apparatus;

Fig. 2 a plan view of the underside thereof; and

Figure 3:
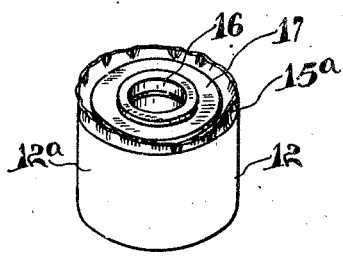

Fig. 3 a perspective view of the friction disk.

In the drawings like numerals of reference indicate corresponding parts in the different figures.

The frame 1 of the apparatus is provided with a boss 2 having a hole extending upwardly from the bottom thereof. The floor finishing tool, shown as a brush 3, has an upwardly extending spindle 4 which has a shoulder $4^a$ formed on its lower end. On the spindle are carried ball bearings 5 and 6 which are held in spaced relationship to one another by means of a distance sleeve 7 which is disposed on the spindle and has its ends in engagement with the inner casings $5^a$ and $6^a$ of the bearings 5 and 6. A distance collar 8 having a transverse groove or recess 9 formed in its periphery is freely disposed on the sleeve. The ends of the collar engage the outer casings of the bearings 5 and 6. A nut 10 threaded on the upper end of the spindle holds all these parts in position thereon so that the assembled spindle and bearings may be inserted in the bore of the boss. To removably secure the parts in the boss, a pin 11 is passed transversely therethrough to engage the recess 9 in the distance collar 8. The sleeve 7 rotates with the spindle and the inner casings of the ball bearings and prevents the nut 10 from being so tightened that it could shift the ball races of the bearing 6 out of alinement. It also distributes any upward thrust equally to both bearings.

The brush is rotated by means of a friction disk 12 secured to the lower end of the armature shaft 13 of a motor 14. The disk is rubber faced for frictional engagement with the periphery of the brush back $3^a$. Any oil leaking past the armature shaft lower bearing $14^a$ is prevented, by means of a cup-shaped device 15 carried on top of the friction disk, from dripping on to the rubber of the latter. The friction disk comprises a sleeve 16 adapted to receive the end of the armature shaft. The upper end of the sleeve is counterbored to receive the enlarged portion $13^a$ of the shaft and is provided with a head under which is fitted a washer 17. The device 15 and the rubber $12^a$ are disposed on the sleeve with the former lying between the upper surface of the rubber and the under surface of the washer 17. These parts are held tightly in position by displacing the metal at the lower end of the sleeve against a washer 18 which engages the lower end of the rubber $12^a$. A nut 19 threaded on the lower end of the armature shaft holds the friction disk in position against the shoulder formed by the enlarged portion $13^a$. The rim $15^a$ of the device 15 prevents any oil from running down the face of the disk and also serves as a distributor to throw the oil upwardly by centrifugal force away from the rubber disk and its co-operating face with the brush.

To take up any wear on the friction disk, the motor is adjustably carried, by means of bolt and slot connections 20, on the frame 1. A screw 21 threaded through the frame is adapted to shift the motor towards the brush when the bolts 20 are loosened.

At the end of the frame remote from the brush are two lugs 22 in which are threaded the stems 23 of axle journals 24. When the axle 25, which carries the ground wheels 26, is passed through the journals they are prevented from turning in the lugs. Any wear on the brush bristles may be readily compensated by removing the axle and adjusting the journals therefor. This arrangement ensures an even wear on the brush bristles.

A fork 27 journalled on the axle 25 carries the handle (not shown) and is adapted to engage the underside of the frame in front of the axle to limit the swinging movement of the frame relative to the fork when the device is being carried. This engagement also permits the pressure of the brush against the floor to be varied.

What I claim is:

1. In floor finishing apparatus the combination of a frame provided with slots; a motor provided with a depending armature shaft; a finishing tool journalled on the frame; a friction disk carried on the shaft and adapted to drive the tool; bolts passed through the slots for adjustably securing the motor to the frame; and a screw threaded through the frame for moving the motor towards the tool when the bolts are loosened.

2. In floor finishing apparatus the combination of a frame; a motor provided with a depending armature shaft; a finishing tool journalled on the frame; a friction disk adapted to drive the tool comprising a sleeve carried on the shaft and provided with a head; a washer disposed on the sleeve for engagement with the head; a cup-shaped device disposed on the sleeve for engagement with the washer, a rubber annulus disposed on the sleeve for engagement with the cup-shaped device; means for holding the cup-shaped device tightly between the annulus and the washer; and means for holding the sleeve on the shaft.

Signed at Toronto, Canada, this 8th day of February 1927.

GEORGE GEARY.